US012671140B2

(12) United States Patent
Kullberg et al.

(10) Patent No.: US 12,671,140 B2
(45) Date of Patent: Jun. 30, 2026

(54) BATTERY DEVICE WITH PROTECTION AGAINST FIRE PROPAGATION

(71) Applicant: POLARIUM ENERGY SOLUTIONS AB, Stockholm (SE)

(72) Inventors: Johan Kullberg, Stockholm (SE); Kenneth Lindgren, Stockholm (SE)

(73) Assignee: POLARIUM ENERGY SOLUTIONS AB, Stockholm (SE)

( * ) Notice: Subject to any disclaimer, the term of this patent is extended or adjusted under 35 U.S.C. 154(b) by 670 days.

(21) Appl. No.: 18/012,291

(22) PCT Filed: Feb. 24, 2022

(86) PCT No.: PCT/EP2022/054599
§ 371 (c)(1),
(2) Date: Dec. 22, 2022

(87) PCT Pub. No.: WO2022/180140
PCT Pub. Date: Sep. 1, 2022

(65) Prior Publication Data
US 2023/0238645 A1     Jul. 27, 2023

(30) Foreign Application Priority Data
Feb. 26, 2021    (EP) ..................................... 21159573

(51) Int. Cl.
*H01M 10/653*          (2014.01)
*H01M 50/204*          (2021.01)
(Continued)

(52) U.S. Cl.
CPC ....... *H01M 50/383* (2021.01); *H01M 10/653* (2015.04); *H01M 50/204* (2021.01);
(Continued)

(58) Field of Classification Search
CPC ............. H01M 50/383; H01M 10/653; H01M 50/204; H01M 50/26; H01M 50/367; H01M 50/394; Y02E 60/10
See application file for complete search history.

(56) References Cited

U.S. PATENT DOCUMENTS 5,042,675 A * 8/1991 Patterson .......... H01M 50/3425
                                                                  429/82
2017/0170439 A1* 6/2017 Jarvis .................. H01M 50/578
(Continued)

FOREIGN PATENT DOCUMENTS

CA          3 055 946          9/2019
JP          2006128062 A      5/2006
(Continued)

OTHER PUBLICATIONS

International Search Report & Written Opinion for Application No. PCT/EP2022/054599 mailed Jun. 15, 2022.

*Primary Examiner* — Lisa S Park
(74) *Attorney, Agent, or Firm* — MOSER TABOADA

(57) ABSTRACT
A battery device (3) is provided. The battery device comprises a casing having a plurality of sides (10a-10f) including a bottom side, a top side opposite to said bottom side, two lateral sides, a front side, and a rear side opposite to said front side, wherein the plurality of sides are assembled to form a sealed container, and a battery cell pack (20) located within the sealed container. The casing comprises at least one outlet (31) arranged at at least one of the plurality of sides. The sealed container is configured to prevent heated gases generated upon a malfunction of the battery cell pack from escaping the casing except via the at least one outlet. The battery device further comprises a filter (13) arranged at said at least one outlet for limiting at least flames from escaping the casing, and terminals for connection of the battery device to a load, another battery device or an external (Continued)

power source, arranged at the front side, and wherein said at least one outlet is arranged at the rear side of the casing.

12 Claims, 5 Drawing Sheets

(51) Int. Cl.

| | | |
|---|---|---|
| *H01M 50/26* | (2021.01) | |
| *H01M 50/30* | (2021.01) | |
| *H01M 50/367* | (2021.01) | |
| *H01M 50/383* | (2021.01) | |

(52) U.S. Cl.
CPC ......... *H01M 50/26* (2021.01); *H01M 50/367* (2021.01); *H01M 50/394* (2021.01)

(56) References Cited

U.S. PATENT DOCUMENTS

| | | | |
|---|---|---|---|
| 2017/0214103 A1* | 7/2017 | Onnerud | H01M 10/0587 |
| 2019/0305276 A1* | 10/2019 | Suzuki | H01M 50/249 |
| 2022/0348068 A1* | 11/2022 | Lee | H01M 10/625 |
| 2023/0369686 A1* | 11/2023 | Puglia | H01M 50/103 |

FOREIGN PATENT DOCUMENTS

| | | |
|---|---|---|
| JP | 2009212081 A | 9/2009 |
| JP | 2016-46163 | 4/2016 |
| WO | WO-2021025539 A1 | 2/2021 |

* cited by examiner

BATTERY DEVICE WITH PROTECTION AGAINST FIRE PROPAGATION

TECHNICAL FIELD

The present disclosure relates to a battery device with protection against fire propagation (or with thermal runaway protection). More specifically, the present disclosure relates to a battery device comprising a casing which is assembled to form a sealed container configured to prevent heated gases generated upon a malfunction of the battery device from escaping the casing except via at least one outlet of the casing.

BACKGROUND

In recent years, the demand for battery devices has increased rapidly all over the world. Efficient batteries are needed in vehicles, in mobile devices and as backup solutions to support necessary functions in case of power failure or outage.

If a battery cell pack, located within the battery device, experiences a critical malfunction, it may go into thermal runaway. In this state, combustion gases and flames may develop inside the battery cell pack, which may in turn affect other elements of the battery device. Combustion gases or flames resulting from thermal runaway of a battery cell pack may lead to the entire battery cell pack or device catching fire or exploding. Further, there is an interest to protect equipment adjacent to the battery device. Hence, it may be of interest to provide a battery device capable of handling a thermal runaway event and/or reducing the risk of fire propagating within the battery device and/or from the battery device to equipment adjacent to the battery device.

SUMMARY

An object of the present disclosure is to provide a battery device which can alleviate at least some of the above-mentioned risks and/or drawbacks. To achieve at least one of this object and other objects, a battery device in accordance with the independent claim is provided. Preferred embodiments are defined by the dependent claims.

According to a first aspect, a battery device is provided. The battery device may comprise a casing, a battery cell pack, and a filter. The casing may have a plurality of sides. The plurality of sides may include a bottom side, a top side opposite to said bottom side, two lateral sides, a front side, and a rear side opposite to said front side. The plurality of sides may be assembled to form a sealed container. The battery cell pack may be located within the casing, specifically within the sealed container. The casing may comprise at least one outlet and the outlet may be arranged at at least one of the plurality of sides of the casing. The plurality of sides of the casing may be assembled to form a sealed container. The sealed container may be configured to prevent heated gases generated upon a malfunction of the battery cell pack from escaping the casing except via the at least one outlet. The filter may be arranged at the at least one outlet for limiting at least flames from escaping the casing. Terminals for connection of the battery device to a load, another battery device or an external power source may be arranged at the front side. The at least one outlet may be arranged at the rear side of the casing.

The battery cell pack may include a plurality of battery cells. The battery cell pack may also be referred to as a cell pack or an assembly of battery cells. Further, by the term "casing", it is further meant, for example, a housing, a chassis, a frame, a chamber, an enclosure or a body of the battery device.

A malfunction of the battery cell pack may include, for example, a thermal runaway of the battery cell pack or of at least one battery cell of the battery cell pack, and/or an ignition of, or by, at least one battery cell of the battery cell pack. A malfunction may result in the propagation of heat and/or the presence of combustion smoke and/or gases within the casing of the battery device, thereby increasing the temperature and/or pressure inside the casing.

The battery device according to the first aspect may more efficiently handle the occurrence of such a malfunction in that the plurality of sides of the casing is assembled to form a sealed container and that the heated gases generated upon the malfunction may only escape the casing (or sealed container) from a side at which the outlet is arranged. The present battery device therefore provides an improved evacuation of heated gases from the battery device. The present battery device provides also a controlled way of evacuating the heated gases in that they may only escape the casing at the outlet(s). Further, the outlet is provided with a filter for handling of e.g. flames resulting from fire caused by the malfunction of the battery device. This improved handling of such a malfunction may in turn reduce the risk of thermal (or fire) propagation to other parts of the battery device and/or to other equipment located adjacent to, or near, the battery device. The sealed container of the present battery device may contain the heated gases and thus prevent them from escaping the casing towards other equipment such as e.g. adjacent battery devices. Similarly, the filter arranged at the outlet is configured for limiting flames, sparks, and/or heated or burning particles, such as heated metal particles for example, from escaping the casing, thereby reducing also the risk of fire propagation from the battery device to equipment adjacent to the battery device.

The outlet may be coupled to a ventilation space outside of the battery device such as e.g. the ambient air of a room in which the battery device is located. As mentioned above, a malfunction of the battery cell pack causing the generation of e.g. heated gases within the battery device will increase the pressure inside the casing and, as the plurality of sides of the casing is assembled to form a sealed container, such heated gases will be forced to exit the casing via the outlet(s).

By the term "outlet", it is further meant, for example, a duct, an exit, a vent and/or an opening. Additionally, the sealed container may also be referred to as an air-tight or gas-tight container.

The filter may comprise a flame-retardant and high-temperature resistant material. The flame-retardant and high-temperature material may comprise a chemical and/or a compound, which may increase the flame retardancy of the filter. The flame-retardant and high-temperature material may be able to withstand a temperature of at least 1500° C. for at least 300 seconds.

The plurality of sides of the casing may include high-temperature resistant and flame-resistant material.

The material of the casing may for example comprise a chemical and/or a compound, which may increase the flame retardancy of the casing. However, the requirements on the material of the casing with respect to temperature and/or fire-resistance may be lower than for the filter since the thermal mass of the casing may prevent it from, or at least reduce the risk of, melting. The material of the casing may for example include aluminium and/or steel. However, other materials and in particular other metals or metal alloys may be envisaged.

The plurality of sides of the casing may be assembled together along a plurality of joints and a sealing element (such as a sealing material, a sealant or a gasket for example) may be arranged at the plurality of joints.

By the term "joints", it is further meant, for example, seams, intersections, junctions, couplings, hinges, or edges. A joint may be defined along a section where sides of the casing are abutting and/or adjoining. For example, a side of the casing may be abutting another side of the casing along a joint. The plurality of sides of the casing may then be attached together by means of fastening means or fasteners such as, for example, screws, bolts, nails, rivets, nuts, couplings, or studs. The sealing element or sealant may then be arranged at such joints. The sealant may be arranged at the fastening means or fasteners used to assemble, or attach together, the plurality of sides of the casing. The sealant may include material for sealing so as to make the joint air-tight and/or gas-tight. The sealant may comprise at least one of silicone, epoxy, plaster, and bonding material.

As an alternative to the use of a sealing element or sealant to form the sealed container, the plurality of sides of the casing may be hermetically welded together. In some variants, the plurality of sides of the casing may also be assembled together to form the sealed container using a combination of hermetical welding (for some of the sides) and use of fasteners and sealant as described above (for the other sides of the casing).

The sealed container may be delimited by the plurality of sides of the casing. By the term "delimited", it is further meant, for example, restricted, constrained and bound. At least one side of the plurality of sides of the casing may comprise a first portion and a second portion. The first portion of a side of the plurality of sides may be assembled to form the sealed container. For example, a bottom side, a top side, and lateral sides of the casing may each comprise a first portion and a second portion, and wherein the first portions of the bottom side, top side, and the lateral sides, and a rear side and a front side of the casing may be assembled to form the sealed container. The second portions of the bottom side, the top side, and the lateral sides may be extending past the front side to for example form a compartment (distinct from the sealed container but possibly adjacent to the sealed container). The compartment may comprise, for example, electronic devices, electrical connections and/or electrical circuitry. Hence, a front side of the casing may be arranged between the compartment and the battery cell pack. Such a compartment may further protect electronic devices, electrical connections and/or terminals of a battery device from heat generation and/or fire started within the sealed container in which the battery pack is located.

The battery device may further comprise a front panel arranged in front of one of the sides of the plurality of sides. A front panel may comprise, for example, electrical connections, an electronic device, and/or circuitry. The arrangement of the front panel at one side of the plurality of sides of the casing may form a compartment in which electronics is located, for example in front of the front side of the casing as mentioned above. Thereby, the front panel and the electronics located in such a compartment may be protected upon a malfunction the battery cell pack as the heated gases and any flames, sparks or residues resulting from the malfunction will be contained within the sealed container.

Further, in the context of the present disclosure, the casing may more generally comprise a top side, a bottom side and a number of sides. The number of sides may be any number, for example, four or more, depending on the geometry of the casing. However, the casing may in most cases have six sides (top, bottom, front, rear and two lateral sides). A side of the casing at which a front panel is arranged may be the front side, and a side of the casing at which the outlet is arranged may therefore be the rear side of the casing (opposite to the front side at which the front panel may be arranged).

The battery cell pack may be disposed within the casing such that heated gases (and flames) are directed towards the outlet via at least one passage (or space) located between the battery cell pack and the top side of the casing or between the battery cell pack and the bottom side of the casing. The battery cell pack may for example be disposed on the bottom side of the casing or in a (semi)-hanging position within the casing. The battery cell pack may for example be disposed in a raised position using for example (plastic) pins for attaching the battery cell pack to the bottom side of the casing. Thereby, there may be a passage (or space) between the battery cell pack and the bottom side of the casing. The battery cell pack may as an alternative be disposed in a hanging position or middle position (in relation to the lateral sides and/or the front and rear sides) using for example (plastic) pins for attaching the battery cell pack to one or more of the lateral sides, the front side and the rear side.

The battery cell pack may be arranged and/or attached on the bottom side of the casing. The sealed casing may include at least a space between the battery cell pack and at least one of a lateral side, a rear side, and a front side of the casing. A battery cell pack disposed on the bottom side of the casing may allow for a more efficient evacuation of the heated gases from the casing of the battery device.

The front panel and/or terminals for connection and the outlet may be arranged at opposite sides of the casing of the battery device. Thereby, heated gases generated upon a malfunction of the battery cell pack are evacuated in a direction away from the front panel and/or terminals for connection. Hence, the front panel and/or terminals for connection may be further protected, thereby further increasing safety in operation of the battery device.

The casing may include a single outlet located at the rear side of the casing. The single outlet may be arranged through the rear side of the casing. The single outlet may be located at a center of the rear side.

The filter may be arranged at the rear side of the casing. The filter may be arranged to cover the entire single outlet. A side of the plurality of sides may comprise an inner surface and an outer surface, wherein the inner surface is opposite to the outer surface. The inner surface may be the surface of the side facing an inside of the casing (which may be referred to as an inward facing surface in the following), and the outer surface may be the surface of the side facing an outside of the casing (which may be referred to as an outward facing surface in the following). The filter may be arranged on an inward facing surface of the rear side of the casing or on an outward facing surface of the rear side of the casing.

In some variants, the casing may include a plurality of outlets, wherein at least some of the outlets of the plurality of outlets are arranged on a side of the casing and other outlets are arranged at another side of the casing. For example, the casing may include at least one outlet on a rear side of the casing and at least one outlet on a top side of the casing. The at least one outlet may be located to allow for an improved, and possibly the most efficient, evacuation of heated gases generated upon a malfunction of a battery cell of the battery cell pack. For example, two adjacent battery devices may each comprise at least one outlet located differently with respect to each other (for example at different levels with respect to, or at different distances from, the bottom side).

The at least one outlet may occupy at least 25% of the area of the rear side of the casing. Preferably, an outlet may occupy at least 40% of the area of the rear side of the casing. The at least one outlet may occupy between 35% and 80% of the area of the rear side of the casing.

The battery cell pack may occupy approximately 40-90% of the volume of the sealed container. As mentioned above, the battery cell pack may be disposed on the bottom side of the casing or even arranged in a middle position such that a passage for heated gases is provided between the bottom side and the battery cell pack and/or another passage is provided between the top side and the battery cell pack.

The battery cell pack may include an arrangement of Lithium-ion based battery cells. The battery cell pack may include an arrangement of rechargeable battery cells.

As mentioned above, the battery device may include electrical terminals, for example provided at a front panel of the battery device. The electrical terminals may be adapted for connection to an external power source (such as another battery device or the main power) and to a load (such as for example an electrical equipment of a base station). The battery device is configured to operate in a charging mode, during which the battery cell pack is charged by the external power source, and in a discharging mode, during which power is provided by the battery device to the load.

The above described embodiments relate in particular to battery devices configured to act as backup batteries in case of main power outage, for example in telecommunications at a wireless communication base station.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

BRIEF DESCRIPTION OF THE DRAWINGS

Exemplifying embodiments of the invention will be described below with reference to the accompanying drawings.

All the figures are schematic, not necessarily to scale, and generally only show parts which are necessary in order to elucidate embodiments of the present invention, wherein other parts may be omitted or merely suggested. Like reference numerals refer to like elements throughout.

DETAILED DESCRIPTION

Figure 1:
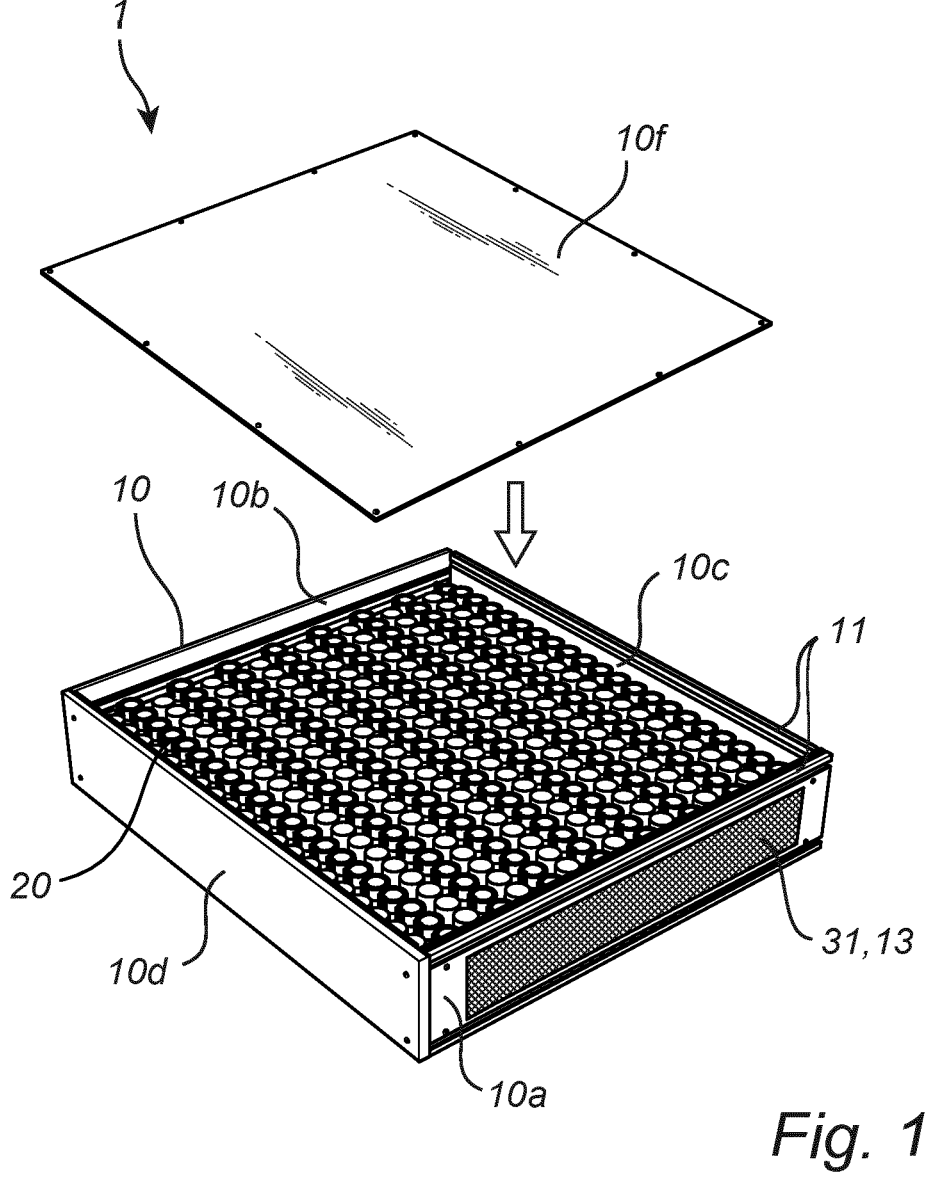
FIG. 1 is a perspective view of a battery device according to one or more exemplifying embodiments.

The present invention will now be described hereinafter with reference to the accompanying drawings, in which exemplifying embodiments are shown. The present inventive concept may, however, be embodied in many different forms and should not be construed as limited to the embodiments set forth herein; rather, these embodiments are provided by way of example so that this disclosure will convey the scope of the invention to those skilled in the art. In the drawings, identical reference numerals denote the same or similar components having a same or similar function, unless specifically stated otherwise.

FIG. 1 is a schematic view of a battery device 1 according to one or more exemplifying embodiments.

The battery device 1 shown in FIG. 1 comprises a casing 10. The casing 10 depicted in FIG. 1 is a rectangular cuboid, where the width and the length are equal. The height of the cuboid shaped casing 10 is less than the width and the length of the casing 10. The present inventive concept is however not limited to a casing 10 comprising a shape as shown in FIG. 1. For example, the casing 10 may have any geometric three-dimensional (3D) shape. The casing 10 comprises a bottom side 10e (not shown, see FIGS. 3 and 5), a top side 10f, two lateral sides 10c, 10d, a front side 10b and rear side 10a. The top side 10f is shown as being arranged above the casing 10 (i.e. not yet assembled). However, the arrangement of the top side 10f in the drawing is purely for facilitating the illustration of some of the inner parts of the battery device 1.

The battery device 1 further comprises a battery cell pack 20. The battery cell pack 20 is located within the casing 10. The battery cell pack 20 may comprise a plurality of battery cells and a frame for holding the plurality of battery cells. In other words, the battery cell pack 20 comprises an arrangement of battery cells. For example, the battery cell pack 20 may comprise an arrangement of Lithium-ion based battery cells. The battery cells may have a cylindrical shape. The battery cells may be arranged in the frame, for example in a standing position.

As shown in FIG. 1, the battery cell pack 20 may be disposed on the bottom side 10e of the casing. The battery cell pack may not occupy the whole volume of the casing and there may be spaces located between the lateral sides 10c, 10d, the front side 10b, the rear side 10a, and the top side 10f of the casing and the battery cell pack 20.

The sides 10a-10f of the casing 10 are assembled to form a sealed container. The sealed container (within which the battery pack 20 is located) is configured to prevent heated gases upon a malfunction of the battery cell pack 20 from escaping the casing 10 except via an outlet 31 located at one side of the casing 10. In the present example, the outlet 31 is arranged at the rear side 10a of the casing 10.

The lateral sides 10d, 10d may be assembled on an inner surface of the bottom side 10e facing an inside of the casing 10, and along opposite edges of the bottom side 10e, wherein the edges may be understood as lateral edges of the bottom side 10e. The front side 10b and the rear side 10a are assembled on the inner surface of the bottom side 10e and along edges of the bottom side 10e, wherein the edges may be understood as a front edge and a rear edge, respectively, of the bottom side 10e. In other words, the lateral, front and rear sides 10a-10d are assembled on the inner surface of the bottom side 10e and along a respective edge of the bottom side 10e.

The lateral, front and rear sides 10a-10d may each form a right angle with the bottom side 10e in order to form a rectangular cuboid (or a box). The top side 10f is assembled on top of the lateral, front and rear sides 10a-10d. Hence, the lateral, front and rear sides 10a-10d may be assembled between respective edges of the bottom side 10e and the top side 10f. In other words, the sides 10a-10f of the casing 10 may be assembled along a plurality of edges 11.

The sides 10a-10f may be assembled in a plurality of different ways. A side 10a-10d may be assembled to the bottom side 10e and/or the top side 10f by a joint, glue, screws, plugs, clips, nuts, bolts, tracks formed in one or more of the sides (the edge of a lateral side could for example glide in a track formed in the bottom side) or any combination thereof. For example, a lateral side 10c, 10d may be assembled to the bottom side 10e by use of a joint (such as, for example, a groove, a groove joint, or a halved joint). The lateral side 10c, 10d may be further assembled to the bottom side 10e by use of, for example, glue, a screw, a plug, a nut and/or a bolt. The sides 10a-10f may be assembled together in such a manner as to avoid, or at least reduce the occurrence of, gaps along adjoined sides 10a-10f. In other words, the sides 10a-10f may be assembled to form tight connections between each other. Additionally, or as an alternative, the sides 10a-10f, or at least some of them, may be welded together to form the sealed container. The tight connections between the sides 10a-10f may be air-tight and/or gas-tight. In case the plurality of sides is assembled using fastening means or fasteners as described above, a sealing element (also referred to as sealant in the following) may be employed to form a sealed container. Thereby, the outlet 31 of the casing 10 may be the only exit for heated gases generated upon a malfunction of the battery cell pack 20.

The outlet 31 shown in FIG. 1 is formed by a hole or opening in the rear side 10a of the casing 10. It will be appreciated that the outlet 31 may be arranged on any side of the casing 10. In the example shown in FIG. 1, the outlet 31 has a rectangular shape. However, the outlet 31 may have substantially any geometrical shape, such as, for example, circular or triangular.

Further, the casing 10 may comprise at least one additional outlet arranged at the same side of the casing as the outlet 31, such as the rear side, or at another side 10b-10f of the casing 10. The outlet 31 may for example be arranged at a center of the rear side 10a. The outlet 31 may occupy approximately 40% of the area of the rear side 10a. However, the outlet 31 may have substantially any size. For example, the casing 10 may comprise a plurality of outlets 31 arranged at the rear side 10a, wherein a total area of the plurality of outlets correspond to at least 25% of the area of the rear side 10a.

The battery device 1 comprises a filter 13, which is arranged at the outlet 31. The filter 13 is provided for limiting at least flames (which might be generated upon a malfunction of a battery cell of the battery pack 20 leading to a fire) from escaping the casing 10. The filter 13 is arranged to completely cover the outlet 31. Accordingly, heated gases resulting from a malfunction of the battery cell pack 20 will escape the casing 10 via the outlet 31 and the filter 13 will prevent flames and/or residues resulting from the fire from escaping the casing 10.

In some variants, in order for the filter 13 to completely cover the outlet 31, the filter 13 may cover a larger area of the rear side 10a than the area of the outlet 31. The filter may therefore be overlapping parts of the rear side 10a which are adjacent to the outlet 31 (or a certain surface of the read side around the outlet 31). The filter 13 may be arranged on an inner surface of the rear side 10a, wherein the inner surface is facing an inside of the casing 10, or on an outer surface of the rear side 10a, wherein the outer surface is facing an outside of the casing. The filter 13 may be attached to the outlet 31 and/or the rear side 10a of the casing 10. The filter 13 may be attached to the casing 10 by use of, for example, glue, screws, clips, bolts, nuts, or any combination thereof.

The battery device 1 shown in FIG. 1 may for example comprise electrical terminals for electrical connection of the battery cell pack 20 to another device or system. The electrical terminals may, for example, be arranged through a front side 10b of the casing 10.

By way of example, the battery device 1 may be used as a backup battery for a base station in a telecommunication system. The battery device 1 may therefore be electrically coupled to an electric power supply (mains power supply for instance) for charging the cells of the battery cell pack 20 (charging mode of the battery device) and to devices of the base station for providing power (discharging mode of the battery device).

Figure 2:
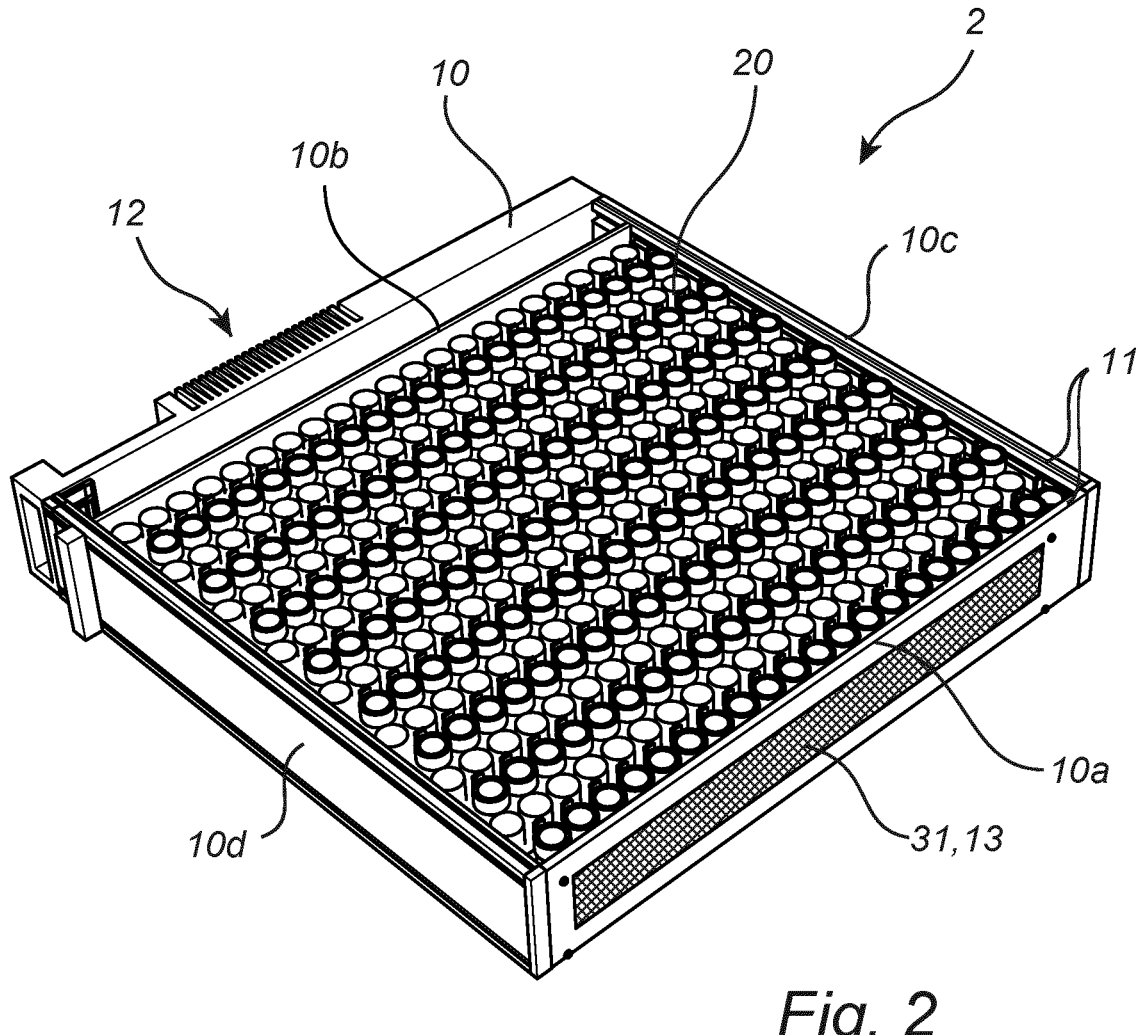
FIG. 2 is a perspective view of a battery device according to one or more exemplifying embodiments.

FIG. 2 is a schematic view of a cross-section of a battery device 1 according to one or more exemplifying embodiments.

The battery device 2 shown in FIG. 2 may comprise features, elements and/or functions corresponding to the battery device 1 described with reference to FIG. 1. The same reference numerals in FIGS. 1 and 2 denote the same or similar components, having the same or similar function.

A difference between the battery devices 1 and 2 shown in FIGS. 1 and 2, is that a (separate) front panel 12 is arranged at the front side 10b of the casing 10 of the battery device 2 shown in FIG. 2.

The front side 10b is arranged on an inner surface of the bottom side 10e (not shown, see FIGS. 3 and 5), wherein the inner surface is facing an inside of the casing 10. The front side 10b is arranged parallel with the rear side 10a. The front side 10b is arranged at a distance from a front edge of the bottom side 10e. Hence, a distance between the front side 10b and the rear side 10a is less than a length of the bottom side 10e. The front side 10b is arranged between the lateral sides 10c, 10d. The sides 10a-10f are assembled to form a sealed container, wherein the sealed container is delimited by the sides 10a-10f of the casing. Thereby, the sealed container is formed by the front side 10b, the rear side 10a and at least portions of the lateral sides 10c, 10d and a portion of the bottom side 10e and a portion of the top side 10f.

The portions of the lateral sides 10c, 10d, the bottom side 10e and the top side 10f which, together with the front side 10b and the rear side 10a, form the sealed container may be understood as first portions of lateral sides 10c, 10d, the bottom side 10e and the top side 10f, respectively. The lateral sides 10c, 10d, the bottom side 10e and the top side 10f may further comprise second portions. The second portions of the lateral sides 10c, 10d, the bottom side 10e and the top side 10f extend from the front side 10b of the casing 10. The second portions may form a compartment distinct from the sealed container but arranged adjacent to the sealed container. In other words, the compartment is a rectangular cuboid with one open, or missing, face. The compartment of the battery device 2 is arranged to receive the front panel 12 and/or terminals for connection of the battery device 2 to a load, another battery device or an external power source. The front panel 12 and/or the terminals may be arranged in front of the front side 10b. Thereby, the front panel 12 and/or the terminals are protected by the front side 10b from heated gases and/or flames generated in case of a malfunction of the battery cell pack 20. The compartment may be formed by at least one second portion of at least one of the lateral sides 10c, 10d, the bottom side 10e and the top side 10f.

Figure 3:
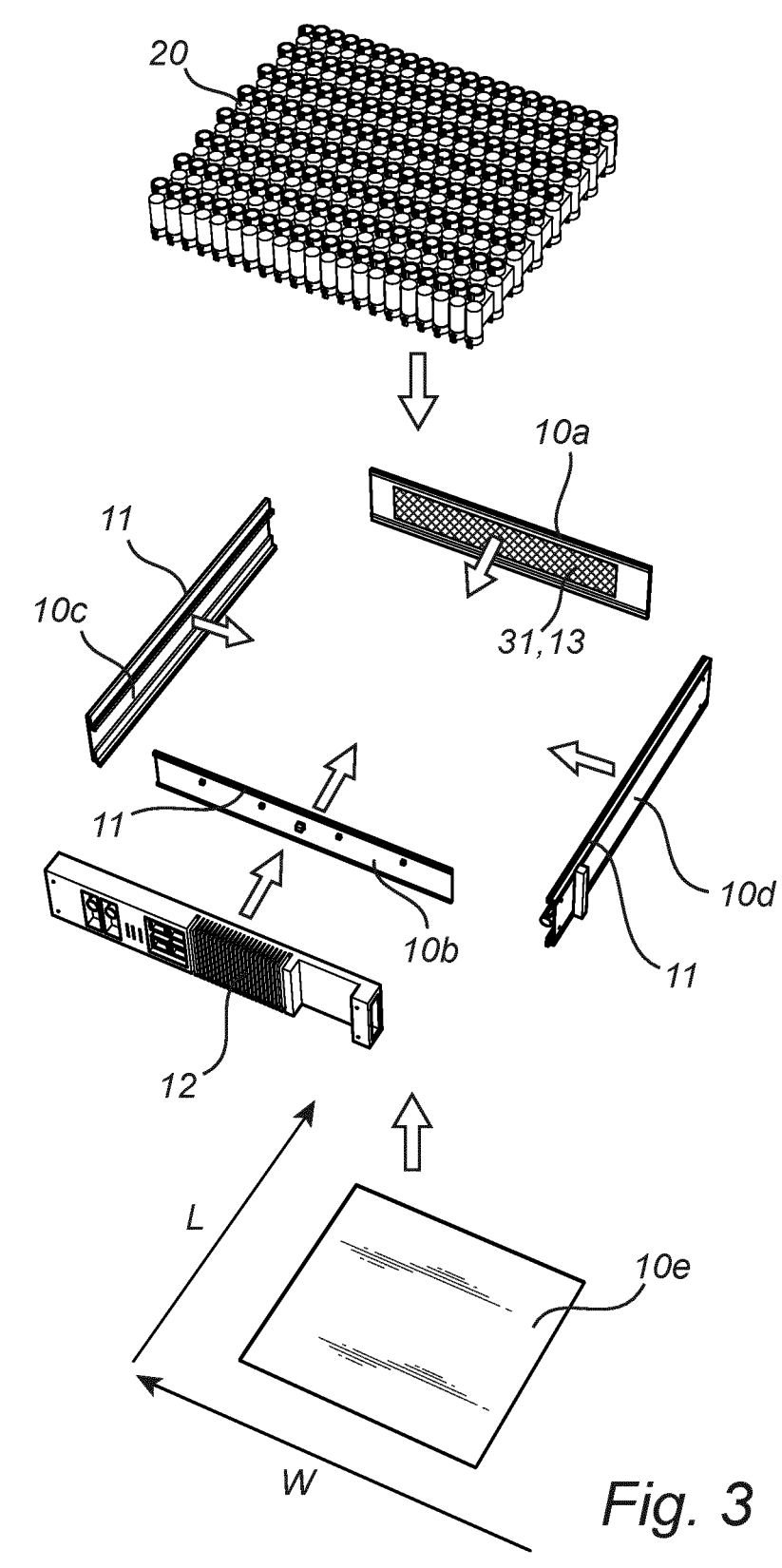
FIG. 3 is an exploded perspective view of a battery device according to one or more exemplifying embodiments.

FIG. 3 is an exploded perspective view of a battery device 3 according to one or more exemplifying embodiments.

The battery device 3 shown in FIG. 3 may comprise features, elements and/or functions corresponding to the battery devices 1 and 2 described with reference to FIGS. 1 and 2, respectively. The same reference numerals in FIGS. 1, 2 and 3 denote the same or similar components, having the same or similar function.

The battery device 3 shown in FIG. 3 does not comprise a top side 10f. However, the lack of a top side 10f in FIG. 3 is purely for facilitating the illustration of the inner parts of the battery device 3.

The bottom side 10e has a length which is measured in a direction which is parallel to an axis L, as represented in FIG. 3. The bottom side 10e has a width which is measured in a direction which is parallel to an axis W, as also represented in FIG. 3. The axes L and W are perpendicular to each other. The front side 10b has a length, along a longitudinal extension of the front side 10b, which is shorter than the width of the bottom plate 10e. The front side 10b may be arranged such that there is a distance between longitudinal ends of the front side 10b and the lateral edges of the bottom side 10e, wherein the distance is measured in a direction which is parallel to the axis W. Such a distance provides spaces for the lateral sides 10c, 10d to be arranged on the bottom side 10e. The distances may be substantially equal to a thickness of the lateral sides 10c, 10d. Further, the front side 10b may be arranged at a distance from the front edge of the bottom side 10e, wherein the distance is measured in a direction which is parallel to the axis L. The distance between the front side 10b and the front edge of the bottom side 10e forms, at least in part, a compartment for receiving electronics. The compartment may be configured to receive the front panel 12.

The front panel 12 may comprise terminals for electrical connection to another battery device, a load or to some electrical equipment such as an external power source. The front panel 12 may also comprise a heatsink provided for dissipating heat generated by the battery cell pack 20.

The battery device 3 may further comprise electrical connections and/or wiring for connecting the battery cell pack to the front panel 12 and/or terminals for electrical connection to another device. The electrical connections and/or wiring may be, at least in part, arranged in the compartment. Additionally, the electrical connections and/or wiring may be coupled to the battery cell pack 20 through the front side 10b. The electrical connections and/or wiring may be insulated. In other words, the electrical connections and/or wiring may be protected in case of a malfunction of the battery cell pack 20.

The lateral sides 10c, 10d of the casing 10 comprises threaded holes, configured to receive screws, nuts or bolts. The front panel 12 may be fastened to the casing by screws, nuts or bolts, which are inserted and fastened to the threaded holes of the lateral sides 10c, 10d of the casing 10.

Figure 4:
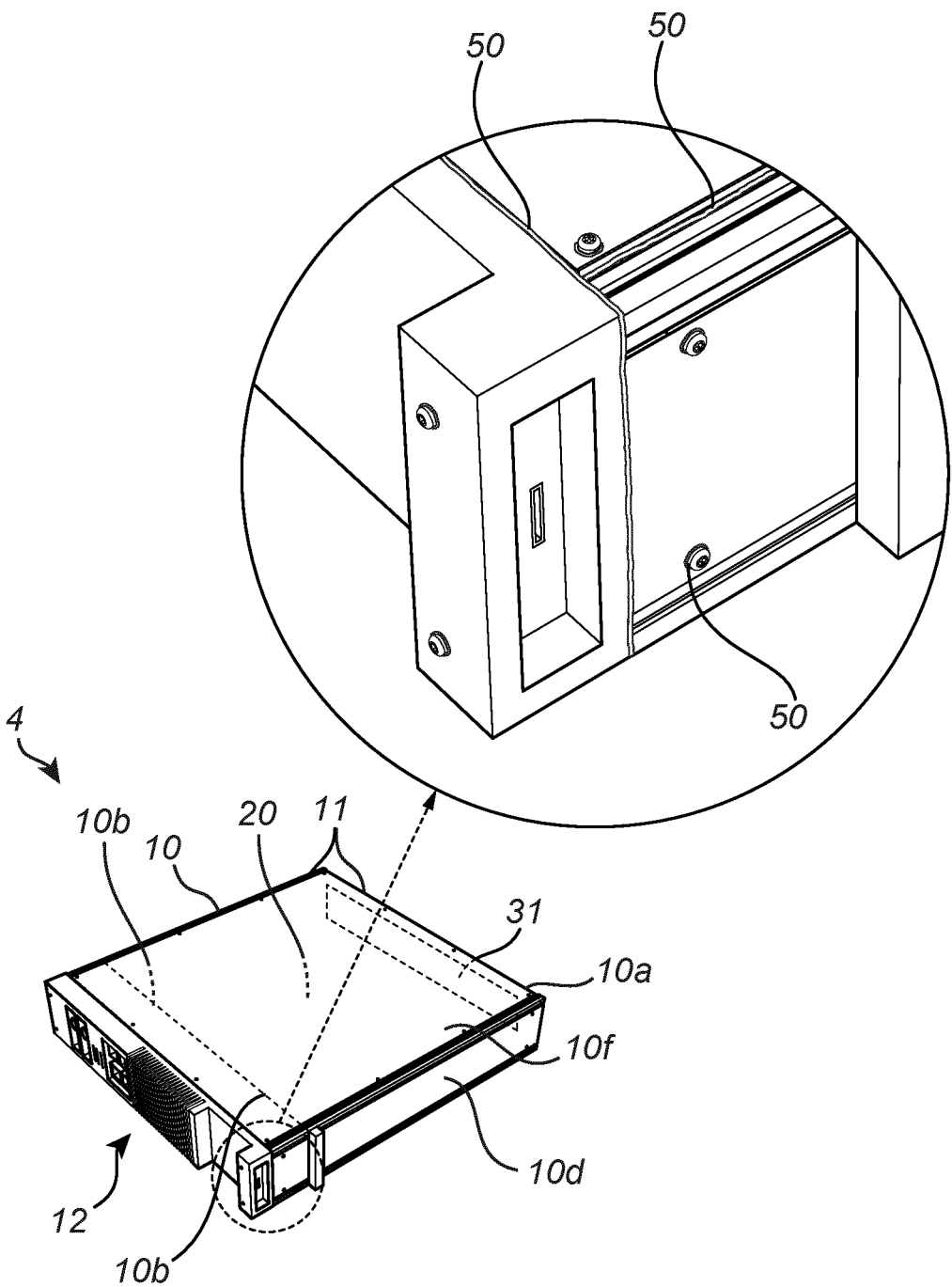
FIG. 4 is a perspective view of a battery device according to one or more exemplifying embodiments.

FIG. 4 is a perspective view of a battery device 4 according to one or more exemplifying embodiments.

The battery device 4 shown in FIG. 4 may comprise features, elements and/or functions corresponding to the battery devices 1-3 described with reference to FIGS. 1 to 3. The same reference numerals in FIGS. 1 to 4 denote the same or similar components, having the same or similar function.

A difference between the battery device 4 shown in FIG. 4 and the battery devices 1-3 shown in FIGS. 1 to 3, respectively, is that the battery device 4 shown in FIG. 4 further comprises a sealant 50. The sealant 50 is arranged at the plurality of joints 11 of the casing 10 such that the joints 11 of the casing 10 are sealed. Further, the sealant may be arranged at apertures and/or openings of the casing, such as, for example, threaded holes for receiving screws or nuts, or vias for electrical connections or wiring. The sealant 50 may be arranged at an inside and/or an outside of the casing 20. Thereby, the sealant 50 may be arranged at the casing 10 to improve the degree of sealing of the sealed container formed by the assembly of the plurality of sides of the casing. The sealant 50 may be a substance for blocking the passage of fluids. The sealant may for example be a mechanical seal. The sealant 50 may include an adhesive. The sealant 50 may comprise silicon, polyurethane, polysulfide, silane-modified polymer, butyl, bitumen, synthetic rubber, acrylate dispersion, and/or silicone emulsion. Further, the sealant 50 may be a sealing tape, a sealing putty, and/or a sealing profile.

Figure 5:
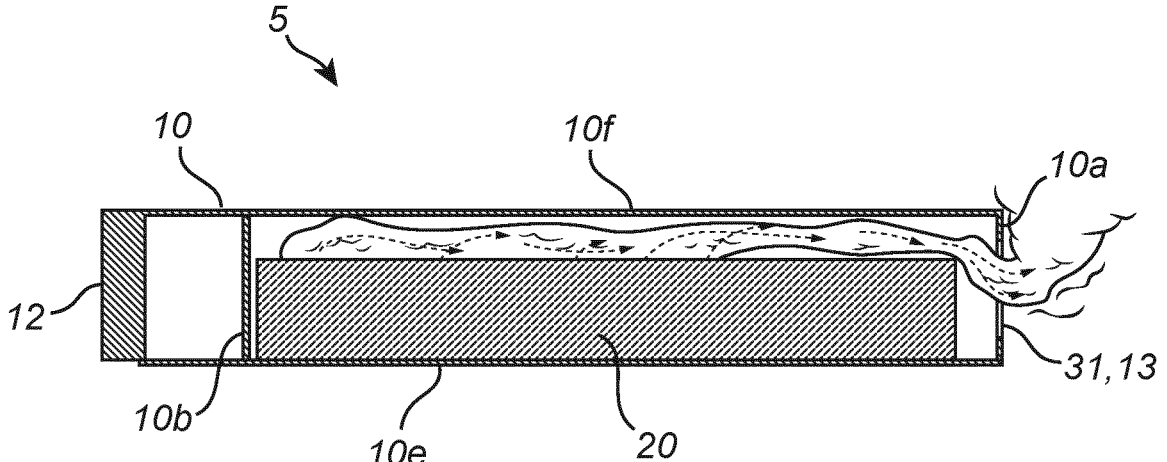
FIG. 5 is a cross-section view of a battery device according to one or more exemplifying embodiments.

FIG. 5 is a cross-section view of a battery device 5 according to one or more exemplifying embodiments.

The battery device 5 comprises a casing 10 with a rear side 10a, a front side 10b, a bottom side 10e and a top side 10f. It is to be understood that the casing further comprises two lateral sides 10c, 10d. However, the lack of the lateral sides 10c, 10d is purely for facilitating the illustration of the inner parts of the battery device 5. The sides 10a-10f of the casing 10 are assembled to form the sealed container, wherein the sealed container is delimited by the sides 10a-10f of the casing 10.

The battery device 5 comprises a battery cell pack 20. In the embodiment shown in FIG. 5, the battery cell pack 20 is disposed on the bottom side 10e of the casing 10 such that heated gases and flames are directed towards an outlet 31 arranged at the rear side 10a of the casing via a passage or space located between the battery cell pack 20 and the top side 10f, the front side 10b and the rear side 10a. However, although the battery cell pack 20 is shown to be disposed on the bottom side of the casing in the present example, it may be positioned differently such as for example in a (semi)-hanging position or in a raised position within the casing. In other words, the battery cell pack may alternatively be positioned such that it is not in physical contact with either one of the bottom side 10e or the top side 10f of the casing 10. The battery cell pack may be raised from the bottom side of the casing or may be attached to one or more of the other sides of the casing by means of for example (plastic) pins.

The battery device 5 comprises a filter 13 arranged at the outlet 31. The filter 13 is configured to limit at least flames from escaping the casing 10.

The battery cell pack 20 shown in FIG. 5 is illustrated during a thermal runaway of at least one (or some) of the battery cells of the battery cell pack 20 or, more generally, a malfunction of at least one (or some) of the battery cells and/or the battery cell pack 20 that causes the generation of heat gases and, possibly, also flames. The heated gas and/or flames are shown in FIG. 5 as originating from some of the battery cells. The cells of the cell pack 20 are arranged such that heated gas and/or flames are directed upwards into the space between the battery cell pack and the top side 10f. As the sides 10a-10f of the casing 10 are assembled to form a sealed container, the heated gas and flames are directed towards the outlet 31 of the casing 10.

The heated gases are prevented, by the sealed container, from escaping the casing except via the outlet 31. The flames and/or any residues such as heated metal particles are limited, by the filter 13, from escaping the casing 10.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

LIST OF EMBODIMENTS

1. A battery device (3) comprising:
   a casing (10) having a plurality of sides (10a-10f),
   a battery cell pack (20) located within the casing,
   wherein the casing comprises at least one outlet (31) arranged at at least one of the plurality of sides,
   wherein the plurality of sides of the casing is assembled to form a sealed container configured to prevent heated gases generated upon a malfunction of the battery cell pack from escaping the casing except via said at least one outlet;
   wherein a filter (13) is arranged at said at least one outlet for limiting at least flames from escaping said casing.
2. The battery device of embodiment 1, wherein the filter comprises a flame-retardant and high-temperature resistant material.
3. The battery device of embodiment 1 or 2, wherein the plurality of sides of the casing includes high-temperature resistant and/or flame-resistant material.
4. The battery device of any one of the preceding embodiments, wherein the plurality of sides (10a-10f) of the casing is assembled together along a plurality of joints (11), and wherein a sealing element is arranged at the plurality of joints.
5. The battery device of any one of the preceding embodiments, wherein the plurality of sides of the casing are hermetically welded together to form the sealed container.
6. The battery device of any one of the preceding embodiments, wherein the sealed container is delimited by the plurality of sides of the casing.
7. The battery device of any one of the preceding embodiments, further comprising a front panel (12) arranged in front of one of the sides of the plurality of sides.
8. The battery device of any one of the preceding embodiments, wherein the plurality of sides of the casing includes a bottom side, a top side opposite to said bottom side, two lateral sides, a front side, and a rear side opposite to said front side.
9. The battery device of embodiment 8, wherein the battery cell pack is disposed within the casing such that heated gases are directed towards the outlet via at least a passage located between the battery cell pack and the top side of the casing or between the battery cell pack and the bottom side of the casing.
10. The battery device according to embodiment 8 or 9, wherein terminals for connection of the battery device to a load, another battery device or an external power source are arranged at the front side, and wherein said at least one outlet is arranged at the rear side of the casing.
11. The battery device according to any one of embodiments 8-10, wherein the casing includes a single outlet located at the rear side of the casing.

12. The battery device according to embodiment 11, wherein said at least one outlet occupies at least 25% of the area of the rear side of the casing.
13. The battery device according to any one of the preceding embodiments, wherein the battery cell pack includes an arrangement of Lithium-ion based battery cells.
14. The battery device according to any one of the preceding embodiments, wherein the battery cell pack occupies approximately 40-90% of the volume of the sealed container.
15. The battery device according to any one of the preceding embodiments, further including electrical terminals for connection to an external power source and to a load, wherein the battery device is configured to operate in a charging mode during which the battery cell pack is charged by the external power source and in a discharging mode during which power is provided by the battery device to the load.

The invention claimed is:
1. A battery device comprising:
   a casing having a plurality of sides including a bottom side, a top side opposite to said bottom side, two lateral sides, a front side, and a rear side opposite to said front side, wherein the plurality of sides are assembled to form a sealed container, wherein the top side, the bottom side, and the lateral sides extend beyond the front side to form a compartment coupled to and distinct from the sealed container, the casing comprising at least one outlet arranged at the rear side of the casing;
   a front panel arranged in front of the front side of the casing to form the compartment; and
   a battery cell pack located within the sealed container,
   wherein the sealed container is configured to prevent heated gases generated upon a malfunction of the battery cell pack from escaping the casing except via said at least one outlet,
   wherein a filter is arranged at said at least one outlet for limiting at least flames from escaping said casing, and
   wherein terminals for connection of the battery device to a load, another battery device or an external power source are arranged at the front panel.
2. The battery device of claim 1, wherein the filter comprises a flame-retardant and high-temperature resistant material.
3. The battery device of claim 1, wherein the plurality of sides of the casing includes high-temperature resistant and/or flame-resistant material.
4. The battery device of claim 1, wherein the plurality of sides of the casing is assembled together along a plurality of joints, and wherein a sealing element is arranged at the plurality of joints.
5. The battery device of claim 1, wherein the plurality of sides of the casing are hermetically welded together to form the sealed container.
6. The battery device of claim 1, wherein the sealed container is delimited by the plurality of sides of the casing.
7. The battery device according to claim 1, wherein the battery cell pack is disposed within the casing such that heated gases are directed towards the outlet via at least a passage located between the battery cell pack and the top side of the casing or between the battery cell pack and the bottom side of the casing.
8. The battery device according to claim 1, wherein the casing includes a single outlet located at the rear side of the casing.

9. The battery device according to claim 1, wherein said at least one outlet occupies at least 25% of the area of the rear side of the casing.

10. The battery device according to claim 1, wherein the battery cell pack includes an arrangement of Lithium-ion based battery cells.

11. The battery device according to claim 1, wherein the battery cell pack occupies approximately 40-90% of the volume of the sealed container.

12. The battery device according to claim 1, wherein the battery device is configured to operate in a charging mode during which the battery cell pack is charged by the external power source and in a discharging mode during which power is provided by the battery device to the load.

\* \* \* \* \*